United States Patent [19]

Holzmann et al.

[11] 4,215,615

[45] Aug. 5, 1980

[54] MONOLITHIC INTEGRATED SELECTION CIRCUIT

[75] Inventors: Dieter Holzmann, Freiburg-Munzingen; Dirk Hoffmeister, Mahlberg, both of Fed. Rep. of Germany

[73] Assignee: ITT Industries, Incorporated, New York, N.Y.

[21] Appl. No.: 19,395

[22] Filed: Mar. 12, 1979

[30] Foreign Application Priority Data

Mar. 20, 1978 [DE] Fed. Rep. of Germany ....... 2812185

[51] Int. Cl.² .......................... G10H 1/00; H04Q 3/00

[52] U.S. Cl. ................................ 84/1.01; 84/DIG. 2; 307/251; 307/303; 307/304; 328/137; 328/154; 340/147 LP

[58] Field of Search ...................... 84/1.01, 1.03, 1.24, 84/DIG. 2, DIG. 7, DIG. 8, DIG. 12, DIG. 20, DIG. 22, DIG. 23; 307/205, 213, 247 R, 247 A, 251, 303, 304; 328/137, 154; 340/147 LP

[56] References Cited

U.S. PATENT DOCUMENTS

| | | | |
|---|---|---|---|
| 3,746,775 | 7/1973 | Uchiyama | 84/DIG. 23 |
| 3,781,450 | 12/1973 | Nakajima | 84/1.01 |
| 3,825,667 | 7/1974 | Schrecongost | 84/1.01 |
| 4,016,792 | 4/1977 | Schrecongost | 84/1.01 |
| 4,064,777 | 12/1977 | Akamatsu | 84/1.03 |

OTHER PUBLICATIONS

Funk-Technik, 1972, Nr. 20, pp. 737–740.

*Primary Examiner*—S. J. Witkowski

*Attorney, Agent, or Firm*—John T. O'Halloran; Peter C. Van Der Sluys

[57] ABSTRACT

The circuit enables the selection of the upper or the lower tone of an electronic organ chord with regard to a switching signal. In response to said switching signal each tone frequency signal handled is either fed to the anode or the cathode of a switch component of a plurality of switch components connected in series whereas the switch components of the tone frequency signal not handled are switched on.

3 Claims, 1 Drawing Figure

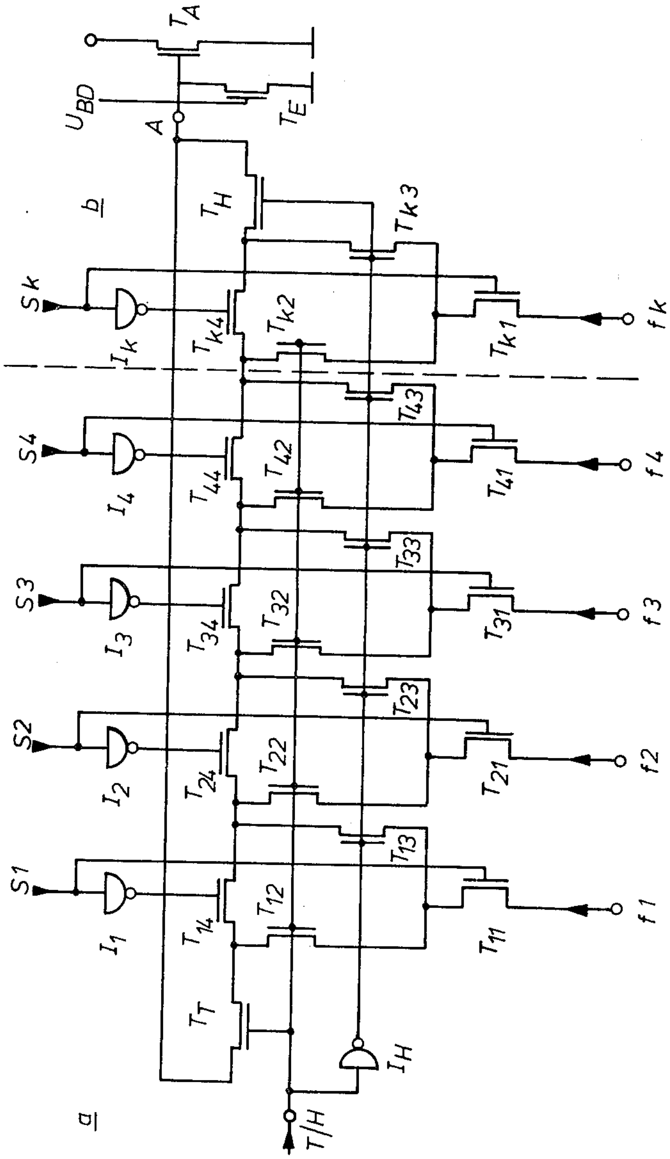
T/H
a
b
A
U_BD
T_A
T_E
T_H
T_T
I_H
S1
S2
S3
S4
Sk
I_1
I_2
I_3
I_4
I_k
T_11
T_12
T_13
T_14
T_21
T_22
T_23
T_24
T_31
T_32
T_33
T_34
T_41
T_42
T_43
T_44
T_k1
T_k2
T_k3
T_k4
f1
f2
f3
f4
fk

MONOLITHIC INTEGRATED SELECTION CIRCUIT

BACKGROUND OF THE INVENTION

This invention relates to a monolithic integrated circuit especially for use with an electronic organ. Such circuits are described in the German technical journal "Funktechnik" (1972), No. 20, pp. 737 to 740, and partly contain circuit stages with the aid of which special effects can be achieved.

SUMMARY OF THE INVENTION

According to this invention there is provided a monolithic integrated selection circuit for selecting the upper or the lower quantity of a sequence of electrical quantities, capable of being selected with the aid of one switch each. The electrical quantities are each applied to a separate input of the selection circuit and either the bottom-most or the top-most quantity, according to a binary selecting signal, is taken off at the output at the selection circuit. The improvement provides that the switching signal of each of the switches is applied to a control electrode of each first switch component which, is arranged in series between its respective input and a second switch component and a third switch component, via which second and third switch components the quantity, as selected by the involved switch, and in accordance with the binary selecting signal is capable of being applied either to a cathode or to an anode of each fourth switch component arranged in a series of fourth switch components in that the series arrangement is disposed on the anode side as well as on the cathode side, in series with one selection switch each, via which selection switches, in accordance with the binary selecting signal, either the signal appearing on the cathode side or on the anode side in the series arrangement, is applied to an output (A), each of the switching signals of the switches is applied invertedly to the control electrode of that particular one of the fourth switch components which, either on the anode side or on the cathode side, contains the electrical quantity as switched by the same switch, and in that the binary selecting signal as applied to the selection switch on the anode side, is applied directly to the control electrodes of the second switch components, and invertedly to the control electrodes of the third switch components.

It is the object of this invention to provide a monolithic integrated circuit with the aid of which a new effect is capable of being achieved, in that from the just played chord there may be selected either the upper or the lower tone, with these two tones capable of being played alternatingly at a predetermined repetition frequency.

Although this object relates to the fields of electric musical instruments, to circuit achieving this object can be basically used for selecting an upper but also the lower quantity from a sequence of selectable electrical quantities.

This invention thus deals with a monolithic integrated selection circuit for selecting the upper or the lower quantity from a sequence of electrical quantities capable of being selected each with the aid of a switch.

BRIEF DESCRIPTION OF THE DRAWINGS

The accompanying drawing shows the basic schematic diagram of a monolithic integrated circuit according to this invention.

DETAILED DESCRIPTION OF THE INVENTION

In accordance with this invention, MOS field-effect transistors are used as the switch components. The switch components may also be designed as bipolar transistors preferably in accordance with the so-called integrated injection logic ($I^2L$) technique.

In the drawing, the references S1 . . . , S4, Sk indicate the switches associated with the keys of an electronic musical instrument and which, in accordance with the key position, either supply the logic Zero or the One. The inputs for the tone frequencies associated with the keys or the switches respectively, are indicated by the references f1, f2 . . . f4, fk.

Quite depending on the position of the selection switch, either the logic Zero or logic One is fed to the selection input, thus selecting either the top-most or the bottom-most frequency value of the depressed key chord. The selection switch may be actuated at a selectable repetition frequency, so that rhythmically either the top-most or the bottom-most tone of the depressed key chord is played, with the remaining tones being faded-out (suppressed). The output of the monolithic integrated selection circuit according to this invention may be connected to the gate electrode of an output transistor $T_A$. To the gate electrode of the highly resistive discharge transistor $T_E$ whose source-drain line is lying between the gate electrode of the output transistor $T_A$ and the reference potential, there is applied the bias voltage $U_{BD}$, so that the gate electrode of the output transistor $T_A$ is kept at "Zero".

The first switch components T14 . . . T44, Tk4 are connected in series with their source-drain lines. In series therewith, there is arranged on the anode side a, the selection switch transistor $T_T$ and, on the cathode side b the selection switch transistor $T_H$. The two ends of the series arrangement consisting of the first switch components and of the selection switches, are arranged in common to the output A, so that the ends of the series arrangement are applied randomly to the output A via the binary selecting signal, because the binary selecting signal T/H is applied directly to the selection switch $T_T$ on the anode side, and invertedly to the selection switch $T_H$ on the cathode side.

The switching signal of each of the switches S1, . . . S4, Sk is applied directly to the gate electrode of a first switch component T11 . . . T41 . . . Tk1, via which, and in accordance with the actuated switches or keys, the electrical quantities are capable of being fed into the selection circuit in the form of tone-frequency signals. In series with the first switch components T11 . . . T41 . . . Tk1 there is arranged each one second switch component T12 . . . T42 . . . Tk2 and each one third switch component T13 . . . T43 . . . Tk3. Since, on the anode side a, the selected electrical quantity is applied to each of the fourth switch components T14 . . . T44 . . . T4k of the aforementioned series connection via the second switch component as connected to the anode of the respective fourth switch component, or since, on the cathode side b, the same electrical quantity is capable of being applied via a third switch component, and the selecting signal T/H is applied, via the inverter $I_H$, to the gate electrodes of the respective pair of a second and third switch component in inverted form, the electrical quantity or the keyed tone signal can be applied rhythmically via the binary selecting signal T/H alternatingly to either the anode or the cathode of the respective fourth switch component. As is shown by the basic circuit diagram of the accompanying drawing, each of the switching signals is applied via one inverter each (I1 . . . I4 . . . Ik) to the control electrode or the gate electrode of that particular one of the fourth switch components or field-effect transistors T14 . . . T44 . . . Tk4 to whose anode a or cathode b there is applied the electrical quantity as switched by the same switch. Accordingly, the monolithic integrated selection circuit only requires one inverter each ($I_k$) and four switching transistors $T_{k1}$ $T_{k2}$ $T_{k3}$ and $T_{k4}$ per electrical quantity or tone.

When the switches S1 . . . S4 . . . Sk are not actuated, hence when the logic Zero is applied to the inputs of the inverters I1 . . . I4 . . . Ik as well as to the control electrodes of the first switch components or the gate electrodes of the first transistors T11 . . . T41 . . . Tk1, then the first switch components T11 . . . T41 . . . Tk1 are blocked. The gate electrode of the output transistor $T_A$ is retained at the logic Zero via the highly resistive discharge transistor $T_E$, so that the output transistor $T_A$ is blocked.

For explaining the mode of operation it being assumed, for example, that the switches S2 and S4 have been keyed, so that the logical One is applied to the inputs of the inverters I2 and I4, with the first switch components T21 and T41 being rendered conductive while the fourth switch components T24 and T44 are rendered non-conductive. If now the selecting signal T/H is applied to the logic Zero, then the selection switch $T_T$ and the second switch components T12 through Tk2 are blocked while the selection switch $T_H$ on the cathode side, and the third switch components T13 through Tk3 are switched to the conducting state. The electrical quantity f4, hence in the present example of embodiment, the corresponding tone-frequency signal can now, via the first switch component T41, the third switch component T43 and the further fourth switch components Tk4, as well as via the selection switch $T_H$, reach the output A for controlling the output transistor $T_A$. If, thereafter, the selecting signal T/H assumes the value "One", then both the selection switch $T_H$ and the third switch components T13 through Tk3 are switched to the non-conducting state while both the selection switch $T_T$ and the second switch components T12 through Tk2 are switched to the conducting state. The electrical quantity f2 corresponding to the lowest tone-frequency signal is applied via the first switch component T21, the second switch component T22, the fourth switch component T14 and the selection switch $T_T$ to the output A of the monolithic integrated selection circuit according to the invention.

Obviously, the same considerations can also be made with respect to any arbitrary "chord", with each time in accordance with the selecting signal T/H, either the upper quantity (highest tone) or the lowest quantity (lowest tone) being rhythmically applied to the output A when rhythmically varying the selecting signal, and the quantities (tones) lying therebetween being suppressed.

The monolithic integrated selection circuit is preferably realized in a space-saving design by using MOS field-effect transistors, or else also bipolar in the $I^2L$-layout. This especially in the presence of a large number of electrical quantities because each of the quantities has to be applied to one input followed by a network including an inverter and four switch components. The monolithic integrated selection circuit according to this invention is suitable for being used whenever from these electrical quantities, which are derived from any other arbitrary quantities (such as temperature, dimensions, amplitudes) there has to be selected or also determined the top-most and/or the bottom-most quantity. Insofar, a practical application to logical operations is deemed conceivable.

While we have described above the principles of our invention in connection with specific apparatus it is to be clearly understood that this description is made only by way of example and not as a limitation to the scope of our invention as set forth in the objects thereof and in the accompanying claims.

We claim:

1. A monolithic integrated selection circuit for selecting the uppermost or the lowermost valued signal from a plurality of signals selected from a sequence of electrical signals, each said signal being selected by the activation of one key switch associated with said signal, either the uppermost or lowermost signal being selected in accordance with a binary selecting signal, said circuit comprising:

a first plurality of inputs, each being adapted to receive one of said sequence of electrical signals;

a second plurality of inputs corresponding to the first plurality of inputs, each input being adapted to receive a switching signal from the key switch associated with said electrical signals;

a plurality of first switch means each having first and second terminals and a control input, the first terminal thereof connected to one of said first plurality of inputs and the control input connected to the corresponding one of said second plurality of inputs;

a plurality of second switch means corresponding to the plurality of first switch means, each having first and second terminals and a control input, the first terminal thereof connected to the second terminal of the corresponding first switch means and the control input adapted to receive said binary selecting signal;

a plurality of third switch means corresponding to the plurality of first switch means each having first and second terminals and a control input, the first terminal thereof connected to the second terminal of the corresponding first switch means;

means for receiving said binary selecting signal and inverting said signal for providing an inverted binary selecting signal to the control inputs of each of the plurality of third switch means;

a plurality of fourth switch means corresponding to the plurality of first switch means, each having first and second terminals and a control input, the first and second terminals of separate switch means being connected to form a series arrangement, the second terminal of the corresponding second switch means being connected to the first terminal of the corresponding fourth switch means and the second terminal of the corresponding third switch means being connected to the second terminal of the corresponding fourth switch means;

means for inverting the switching signals received at the second plurality of inputs and for providing the inverted switching signal to the control input of the corresponding fourth switch means;

a first selection switch disposed at a first end of said series arrangement of fourth switch means and having a first terminal connected to the first terminal of the fourth switch means corresponding to the lowermost electrical signal and a control input adapted to receive the binary selecting signal;

a second selection switch disposed at the second end of the series arrangement of fourth switch means and having a first terminal connected to the second terminal of the fourth switch means corresponding to the uppermost electrical signal and having a control input adapted to receive the inverted binary selecting signal; and an output terminal connected to the second terminals of the first and second selection switches, whereby in accordance with the binary selecting signal, either the uppermost or lowermost electrical signal of those selected in accordance with the inputs received at the second plurality of inputs are provided at the output.

2. The monolithic integrated circuit as described in claim 1 wherein said circuit is used in selecting the uppermost or the lowermost tone of a chord from a sequence of tone-frequencies whose tone frequencies are applied to the first plurality of inputs and the switching signals are provided by activation of the keys of a musical instrument.

3. The monolithic integrated circuit as described in claim 1, wherein the first, second, third and fourth switch means and the first and second selection switches comprise MOS field-effect transistors.

* * * * *